Oct. 14, 1941.         P. VOLLRATH              2,258,830
       ELECTRIC STIRRING APPARATUS ACTUATED BY HAND
                    Filed March 16, 1940
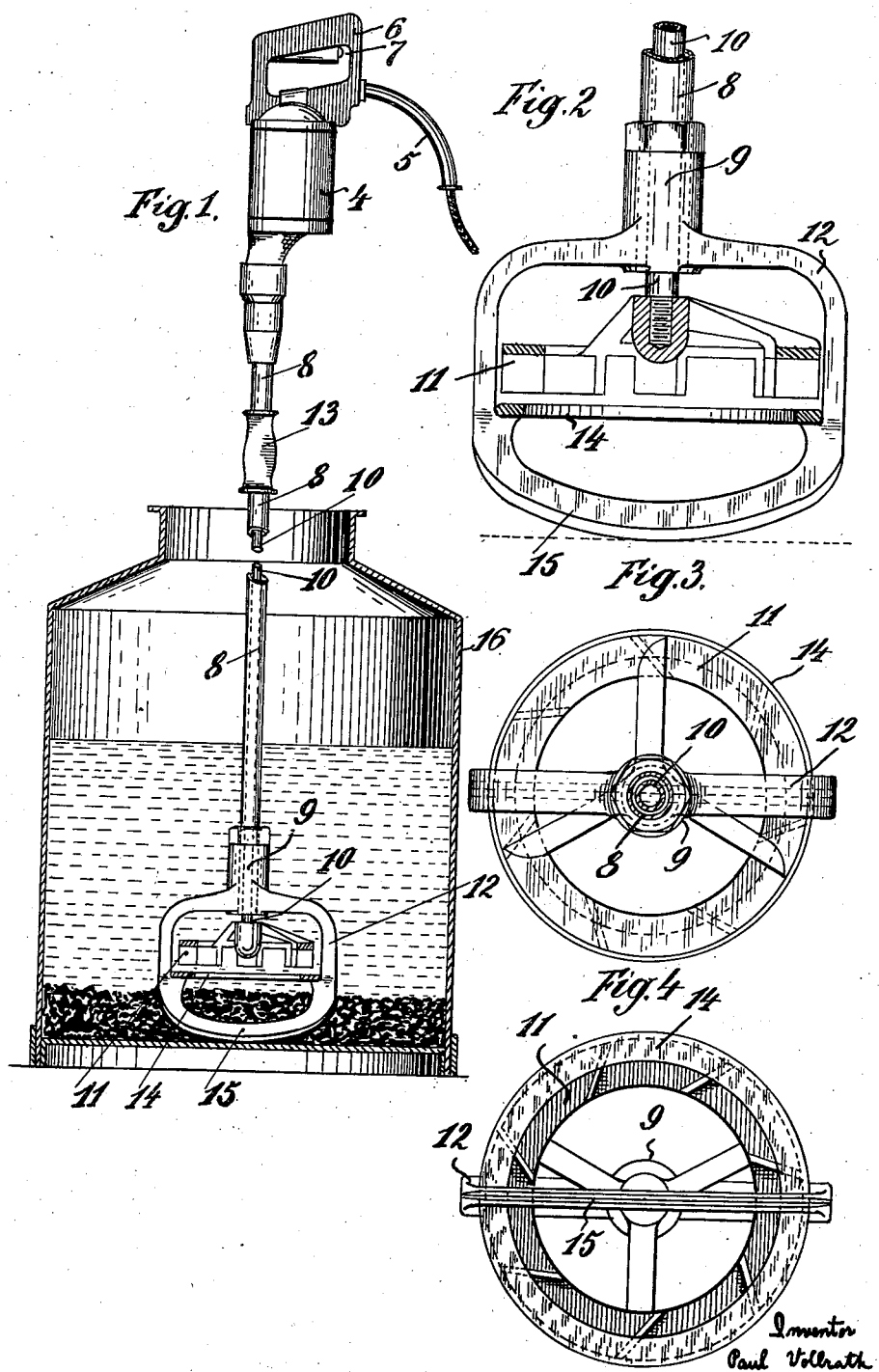

Patented Oct. 14, 1941

2,258,830

UNITED STATES PATENT OFFICE 2,258,830

ELECTRIC STIRRING APPARATUS ACTUATED BY HAND

Paul Vollrath, Cologne-on-the-Rhine, Germany

Application March 16, 1940, Serial No. 324,259
In Germany October 11, 1938

1 Claim. (Cl. 259—133)

For stirring the contents of cans, transporting drums, barrels and similar vessels, electric stirring apparatus actuated by hand have been used recently. These apparatus consist usually of an electromotor connected by a flexible shaft with a stirring apparatus actuated by hand.

It has also been proposed to detachably mount by suitable clamping devices on the edge of the corresponding vessel a motor which carries at its front end on a rigid shaft a stirring device.

All these known arrangements possess the inconvenience, as far as flexible shafts are employed, that these shafts easily break and cause injury to person and property.

Another inconvenience is that special suspension devices in the room or mounting arrangements must be provided on the vessel.

A further inconvenience is that the vessels are easily damaged by the mixing tools, this being a source of danger for the reason that sparks may be produced by the striking of the stirring tools against the wall of the vessel.

The result is that the person operating the apparatus takes care not to come too close to the bottom and walls of the vessel, so that the sediment on the bottom is stirred only poorly or incompletely.

From the German specification 382,249 a stirring and beating device has already become known which preferably serves for whipping eggs, cream, beverages and the like, in which on one end of a tube the casing of the driving motor and at the other end a cage for the stirring tool are fixed and the shaft for the stirring tool is mounted in the tube. The cage serves for the purpose that even in open and wide containers, such as cups and dishes, squirting of the material to be stirred cannot take place. According to the invention such a cage is also provided to serve as protecting cage, but, according to the invention, this cage is carried out so that it can serve at the same time as a tool. According to the invention the lower portion of the protecting cage surrounding the stirring tool is constructed as scraping knife or spatula, so that by to and fro movement of the apparatus even a very stiff sediment, for instance of lacquers and paints, can be detached from the bottom or from the casing wall.

An embodiment of the invention is illustrated by way of example in the accompanying drawing, in which Fig. 1 shows the device in elevation, Fig. 2 shows on larger scale the lower part of the stirring device, Fig. 3 is a top plan view of Fig. 2, Fig. 4 shows the stirring device viewed from below.

The apparatus consists of a driving motor mounted in a casing 4 and to which electric current is fed by a cable 5. A handle 6 with switch 7 is arranged on the upper end of the casing 4, and from the lower end of this casing extends a tube 8 to the lower end of which a protecting cage 9 is fixed. The shaft 10 connected with the motor extends through the tube 8, this shaft carrying at its free end a stirring tool 11 of any desired construction surrounded by the cage 9. The protecting cage 9 consists of a stirrup 12 and of a horizontal ring 14 under the stirring disc 11. The lower portion 15 of the stirrup 12 is constructed according to the invention as a scraping knife or spatula. A handle 13 is mounted on tube 8 below the motor casing 4.

When the apparatus is to be used the operator grips the handle 6 with the right hand and with the left hand the handle 13 and introduces the apparatus into the vessel 16. By means of the switch 7 the motor is started, so that the stirring tool 11 rapidly rotates. The operator then moves the apparatus to and fro on the bottom of the vessel 16 in a manner similar to the movement of a scrubbing-brush, so that the sharp edge 12 of the stirrup 15 scrapes off the sediment from the bottom, whereas the stirring tool causes the sediment to mix with the liquid.

As there is no danger that either the stirring tool or the container might be damaged, even unskilled men can safely attend to the apparatus. The sediment is stirred up in the shortest time as it is scraped off by the scraping knife of the protecting cage and also for the reason that the stirring tool works always in closest proximity to the bottom or wall of the vessel, so that it is of especially good efficiency.

Instead of the stirring tool shown any other stirring device may be employed and any desired modifications as regards construction may be made without departing from the scope of the invention.

What I claim as my invention and desire to secure by Letters Patent of the United States is:

Electric hand apparatus for stirring liquid with stiff sediment, comprising a driving motor having a casing and a shaft, a tube fixed to said casing through which said shaft extends, a stirring tool fixed to said shaft beyond the end of said tube, a cage surrounding said tool and fixed to said tube, and a blade extending from said cage and having a scraping edge for scraping the sediment from the bottom of a vessel containing the liquid to be stirred.

PAUL VOLLRATH.